US011772833B1

(12) United States Patent
Shi et al.

(10) Patent No.: US 11,772,833 B1
(45) Date of Patent: Oct. 3, 2023

(54) SYSTEMS AND METHODS FOR AUTOMATED CUSTOM SHIPPING CONTAINERS

(71) Applicant: Amazon Technologies, Inc., Seattle, WA (US)

(72) Inventors: Jane Shi, Tewksbury, MA (US); Fan Wang, Durham, NC (US)

(73) Assignee: Amazon Technologies, Inc., Seattle, WA (US)

( * ) Notice: Subject to any disclaimer, the term of this patent is extended or adjusted under 35 U.S.C. 154(b) by 698 days.

(21) Appl. No.: 16/834,782

(22) Filed: Mar. 30, 2020

(51) Int. Cl.
| | |
|---|---|
| *B65B 5/08* | (2006.01) |
| *B65B 5/10* | (2006.01) |
| *B65B 5/12* | (2006.01) |
| *B25J 9/16* | (2006.01) |
| *B25J 19/02* | (2006.01) |
| *B65B 59/00* | (2006.01) |
| *B65G 1/137* | (2006.01) |
| *G06T 7/50* | (2017.01) |
| *G06T 7/62* | (2017.01) |
| *G06T 7/70* | (2017.01) |
| *B65B 5/02* | (2006.01) |

(52) U.S. Cl.
CPC ............... *B65B 5/08* (2013.01); *B25J 9/1669* (2013.01); *B25J 9/1697* (2013.01); *B25J 19/023* (2013.01); *B65B 5/02* (2013.01); *B65B 5/105* (2013.01); *B65B 5/12* (2013.01); *B65B 59/001* (2019.05); *B65G 1/1373* (2013.01); *G06T 7/50* (2017.01); *G06T 7/62* (2017.01); *G06T 7/70* (2017.01); *B65B 2210/04* (2013.01)

(58) Field of Classification Search
CPC .. B65B 5/08; B65B 5/02; B65B 5/105; B65B 5/12; B65B 59/001; B65B 2210/04; B25J 9/1697; B25J 9/1669; B25J 19/023; B65G 1/1373; G06T 7/50; G06T 7/62; G06T 7/70
See application file for complete search history.

(56) References Cited

U.S. PATENT DOCUMENTS

| 9,205,886 B1 * | 12/2015 | Hickman ............. G05D 1/0274 |
| 2012/0233967 A1 * | 9/2012 | Bellante ............. B65D 85/8043 53/539 |
| 2013/0000252 A1 * | 1/2013 | Pettersson ............... B65B 5/024 348/46 |

(Continued)

*Primary Examiner* — Thomas Randazzo
(74) *Attorney, Agent, or Firm* — Eversheds Sutherland (US) LLP

(57) ABSTRACT

Systems, methods, and computer-readable media are disclosed for automated custom shipping containers. In one embodiment, an example system may include a depth camera, a first robotic arm configured to grasp objects, a box making machine configured to generate boxes, and a computer system. The computer system may be configured to determine a depth map of a first object and a second object using the depth camera, determine a first dimension of the first object, determine a second dimension of the second object, and determine a first box dimension for a box in which the first object and the second object are to be placed using the first dimension and the second dimension. The computer system may be configured to cause the box making machine to produce the box, and cause the first robotic arm to place the first object and the second object into the box.

19 Claims, 7 Drawing Sheets

(56) References Cited

U.S. PATENT DOCUMENTS

| | | | |
|---|---|---|---|
| 2014/0059981 A1* | 3/2014 | Pettersson | G01B 11/00 53/504 |
| 2015/0360801 A1* | 12/2015 | Sytema | B65B 49/16 53/74 |
| 2018/0022493 A1* | 1/2018 | Lamb | B65B 5/024 700/103 |
| 2018/0265228 A1* | 9/2018 | Hagestedt | G06F 30/17 |
| 2019/0073760 A1* | 3/2019 | Wang | G06T 7/001 |
| 2019/0084762 A1* | 3/2019 | Fujihara | B25J 15/0061 |
| 2019/0185267 A1* | 6/2019 | Mattern | B65B 5/105 |
| 2020/0095001 A1* | 3/2020 | Menon | B65B 5/08 |
| 2020/0148489 A1* | 5/2020 | Diankov | G06T 7/55 |
| 2020/0246838 A1* | 8/2020 | Liu | B07C 3/08 |
| 2020/0316787 A1* | 10/2020 | Fujihara | B25J 15/0052 |
| 2020/0339350 A1* | 10/2020 | Dooley | B65G 1/0492 |
| 2020/0376668 A1* | 12/2020 | Russell | B65B 43/46 |
| 2020/0406477 A1* | 12/2020 | Jeremiah | B25J 9/1664 |
| 2021/0018914 A1* | 1/2021 | Menon | B25J 9/1689 |
| 2021/0129333 A1* | 5/2021 | Kanunikov | B25J 9/1666 |

\* cited by examiner

SYSTEMS AND METHODS FOR AUTOMATED CUSTOM SHIPPING CONTAINERS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. For example, use of robotic equipment to move or otherwise handle objects may improve efficiency. However, such robotic equipment may have difficulty completing certain tasks. Accordingly, improvements in various operations of order fulfillment, such as improvements to picking technology, sorting technology, packing technology, and so forth may be desired, such that manual efforts can be redirected to different tasks.

Figure 1:
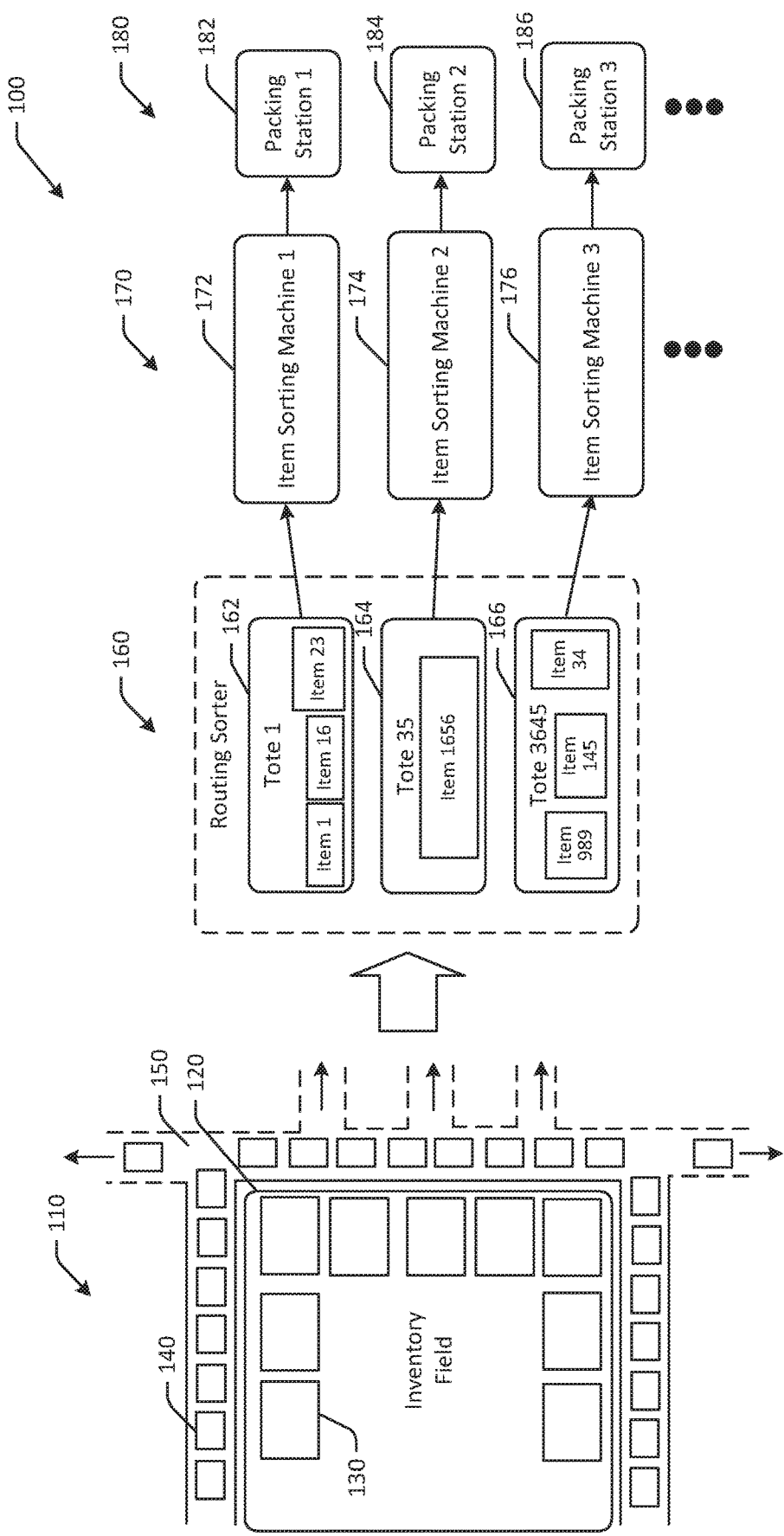
FIG. 1 is a hybrid schematic illustration of an example use case for automated custom shipping containers in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, may be difficult depending on a type of packaging in which the item comes with. Humans may be able to manually handle individual items with ease. However, robotic handling of individual items may require various levels of dexterity. For example, robotic handling of items that are stationary may be relatively more reliable than robotic handling of items that are moving. Moreover, fulfillment centers may include lengthy conveyors that may be used to transport objects, such as packages, products, items, or other objects. In addition, some processes, such as packing processes, may rely on manual effort to complete.

For example, a packing process may include obtaining a set of sorted items for an order, obtaining a box in which to place the items, and placing the items into the box. However, depending on the availability of boxes of various dimensions, in some instances, a box having significantly larger dimensions that the one or more items placed into the box may be used, so as to avoid delay of the shipment of the item(s). Accordingly, there may be a small item inside a large box (along with packing material, such as recycled paper, etc. in some instances). Not only may such instances lead to surprise by a recipient of the large box, but may also be inefficient and less environmentally friendly.

To solve such issues, embodiments of the disclosure may generate custom-sized boxes that are sized to fit the specific items in an order, thereby reducing waste, reducing use of materials, increasing efficiency, and reducing an environmental impact. Some embodiments include robotic systems that are configured to pack orders. For example, as items are picked and sorted, dimensions for customized shipping containers can be determined and used to create custom boxes or other containers for packing and shipping of the items. Some embodiments may determine a packing sequence or order in which the items are to be placed into the custom box to achieve optimal and/or maximized packing density.

Embodiments of the disclosure include methods and systems for automated custom shipping containers that may improve processing and fulfillment of orders. Certain embodiments include systems with robotic arms that can be used to retrieve or otherwise grasp objects and to place the objects into a custom-sized box that may be generated at least partially synchronously by a box making machine or other custom container generation system. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for automated custom shipping containers and an example process flow in accordance with one or more embodiments of the disclosure. Although discussed in the context of online orders, other embodiments may be directed to any suitable use case where objects are picked and released, such as instances where objects are picked from inventory, placed into containers, removed from containers for sorting, packed into boxes, and so forth.

In FIG. 1, a fulfillment center may include an inventory field 110, a routing sorter 160, one or more item sorting machines 170, and one or more packing stations 180. The inventory field 110 may be include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. For example, systems as described herein may be used to pick objects from moving conveyors, move the objects laterally, and place the retrieved objects into containers or onto other surfaces. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated custom shipping containers, where the items are delivered to the picking stations 130 after being retrieved from the inventory field 110. Any number of picking stations 130 may be included, and the picking stations 130 may be located in a different position than that illustrated in FIG. 1.

One or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be associated with particular item sorting machines, and may be moved using the conveyors 150 to a routing sorter 160.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of objects is used, such as to pick items from inventory, place items in totes, remove items from totes, place items into bins, remove items from bins, place items into boxes for shipping, and so forth, automated custom shipping containers systems and methods as described herein may be used. As a result, manual effort can be redirected to other tasks.

Embodiments of the disclosure include systems and methods for automated custom shipping containers. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
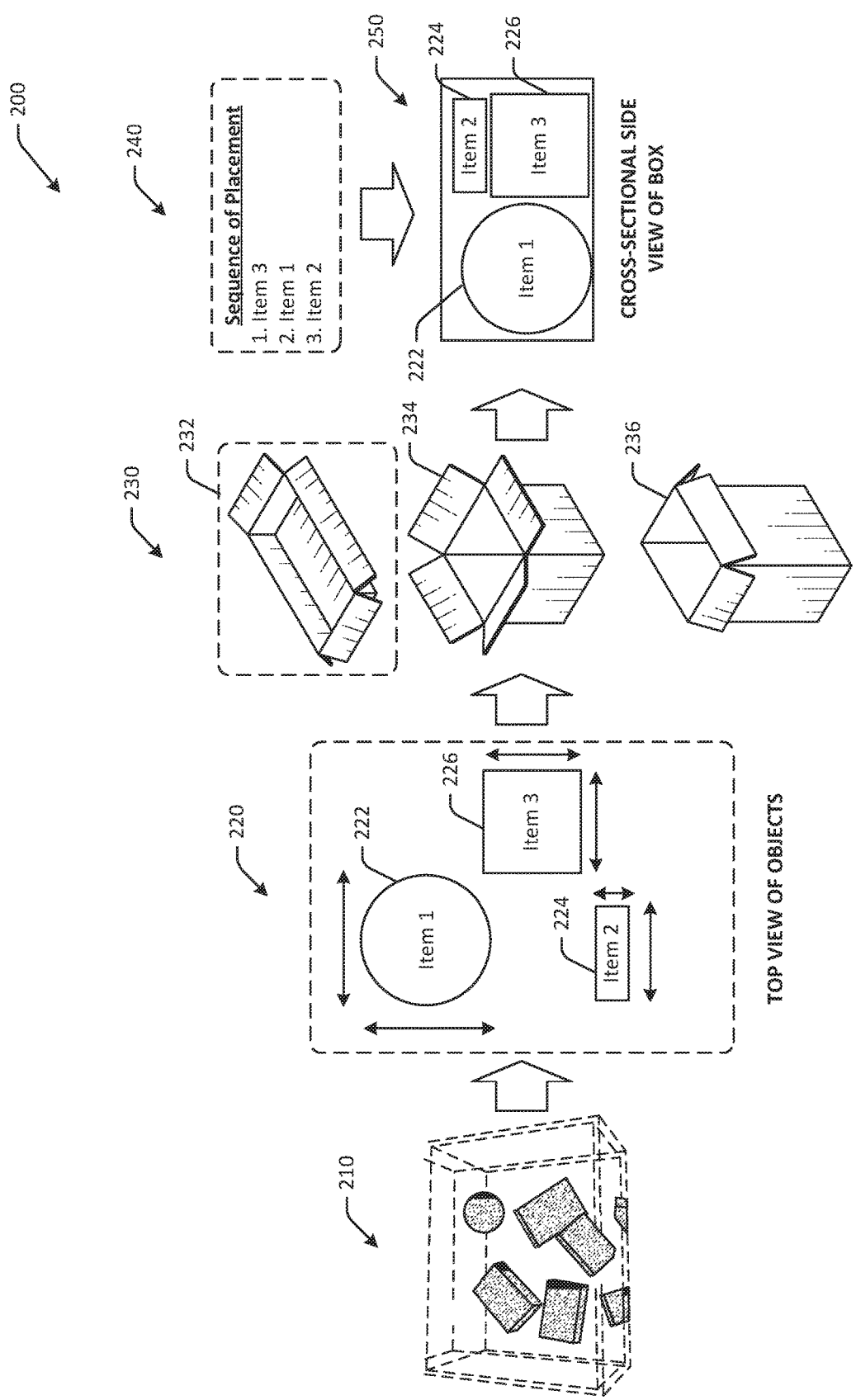
FIG. 2 is a schematic illustration of an example system and process flow for automated custom shipping containers in accordance with one or more embodiments of the disclosure.

FIG. 2 is a schematic illustration of an example system and process flow 200 for automated custom shipping containers in accordance with one or more embodiments of the disclosure. Other embodiments may include additional or fewer components. The illustration of FIG. 2 may not be to scale, and may not be illustrated to scale with respect to other figures.

In FIG. 2, objects for packing 210 may be delivered to an automated custom shipping container system. At the automated custom shipping container system, the objects may be imaged using a depth camera to produce an image 220 or depth map. For example, as illustrated in FIG. 2, a top view of the objects may be captured using a depth camera. The automated custom shipping container system may be configured to determine one or more dimensions of the objects using the image 220 and/or depth map. For example, a length, width, height, and/or volume of a first object 222, a second object 224, and/or a third object 226 may be determined. In the example of FIG. 2, the first object 222, second object 224, and third object 226 may be part of the same order and may be packed into a single box. The first object 222 may be a spherical object, such as a basketball, the second object may be a flat box 224, such as a cereal box, and the third object 226 may be a cube-shaped package.

The automated custom shipping container system may be configured to determine one or more custom box dimensions based at least in part on the one or more dimensions of the individual objects. For example, based at least in part on a combined height, width, length, and/or volume of the objects to be packed, the automated custom shipping container system may determine corresponding dimensions for a custom-sized box.

Based at least in part on one or more dimensions of the respective first object 222, the second object 224, and the third object 226, and/or based at least in part on one or shapes of the objects to be packed, the automated custom shipping container system may also determine or select a box type 230 in which the objects are to be packed. For example, a first box type 232 may be a horizontal rectangular box type, a second box type 234 may be a cube box type, a third box type 236 may be a vertical rectangular box type, and so forth.

The automated custom shipping container system may be configured to determine a sequence of placement 240 representing an order in which the items are to be placed into the custom-sized box. For example, the sequence of placement 240 may indicate that the third object 226 is to be placed into the box first, the first object 222 is to be placed into the box second, and the second object 224 is to be placed into the box last.

Accordingly, the automated custom shipping container system may cause a robotic arm to place the objects into the custom made box 250 in accordance with the sequence of placement 240. As illustrated in the cross-sectional side view of the box in FIG. 2, the sequence of placement may reduce the likelihood of the basketball or spherical object rolling after placement. The automated custom shipping container system may account for other such shapes, such as cylinders, etc., and the robotic arm may place the objects into the box using the sequence of placement, and in instances where applicable, at a designated orientation.

The automated custom shipping container system may include one or more robotic arms that may be used to pick objects of various form factors and with different packaging materials off of a surface and to move objects from a first location to a second location. The automated custom shipping container system may include an overhead assembly. One or more cameras or camera systems may be mounted to the overhead assembly. The cameras may be used to generate a point cloud representation that can be used to determine object dimensions.

The robotic arms and/or the automated custom shipping container system depicted in FIG. 2 may be disposed at various locations within a fulfillment center or other facility. For example, at a packing station for single or multi-item orders, and so forth. Embodiments may be used at any one or more of these locations to perform packing or object handling tasks.

In an embodiment, the automated custom shipping container system may be a robotic system that includes a first robotic arm configured to move about a tabletop surface or other surface, and a depth camera that may be coupled to the first robotic arm. The depth camera may be configured to generate three-dimensional representations of one or more objects, such as a first object, a second object, and a third object on the tabletop or other surface. The automated custom shipping container system may include a second robotic arm configured to pick the objects off the tabletop or other surface and place the objects into a custom-sized box. The automated custom shipping container system may be in communication with, or may include, an on demand custom box making machine configured to generate corrugate boxes or other containers, such as bubble wrap containers or mailers, of custom dimensions. The automated custom shipping container system may include a computer system in communication with the first robotic arm, the depth camera, the second robotic arm, and the custom box making machine. The computer system may be configured to determine first dimensions of the first object using the depth camera, determine second dimensions of the second object using the depth camera, and determine third dimensions of the third object using the depth camera. The computer system may determine box dimensions of the custom-sized box based at least in part on the first dimensions, the second dimensions, and the third dimensions, and may cause the custom box making machine to generate the custom-sized box. The computer system may cause the second robotic arm to place the objects into the custom-sized box. The box may then be sealed and shipped.

In instances where the depth camera is coupled to the first robotic arm, the computer system may be configured to cause the first robotic arm to move the depth camera around lateral sides of the tabletop surface to image side surfaces of the objects, and over the tabletop or other surface to image top surfaces of the objects. The computer system may process the three-dimensional representations to identify discrete object representations.

In some embodiments, the computer system may determine a first shape of the first object, determine a second shape of the second object, and determine a third shape of the third object. The computer system may determine an optimal packing arrangement based at least in part on the first shape, the second shape, and the third shape, such as the arrangement illustrated at 250 in FIG. 2. The computer system may determine a sequence of placement for the objects into the custom-sized box based at least in part on the optimal packing arrangement. For example, a first object may be placed into the custom-sized box after a second object and before a third object.

Embodiments of the disclosure avoid potential issues related to packing objects into boxes that are too large, as well as potential issues related to box or other container inventory. As a result, throughput may be increased and waste may be decreased.

Figure 3:
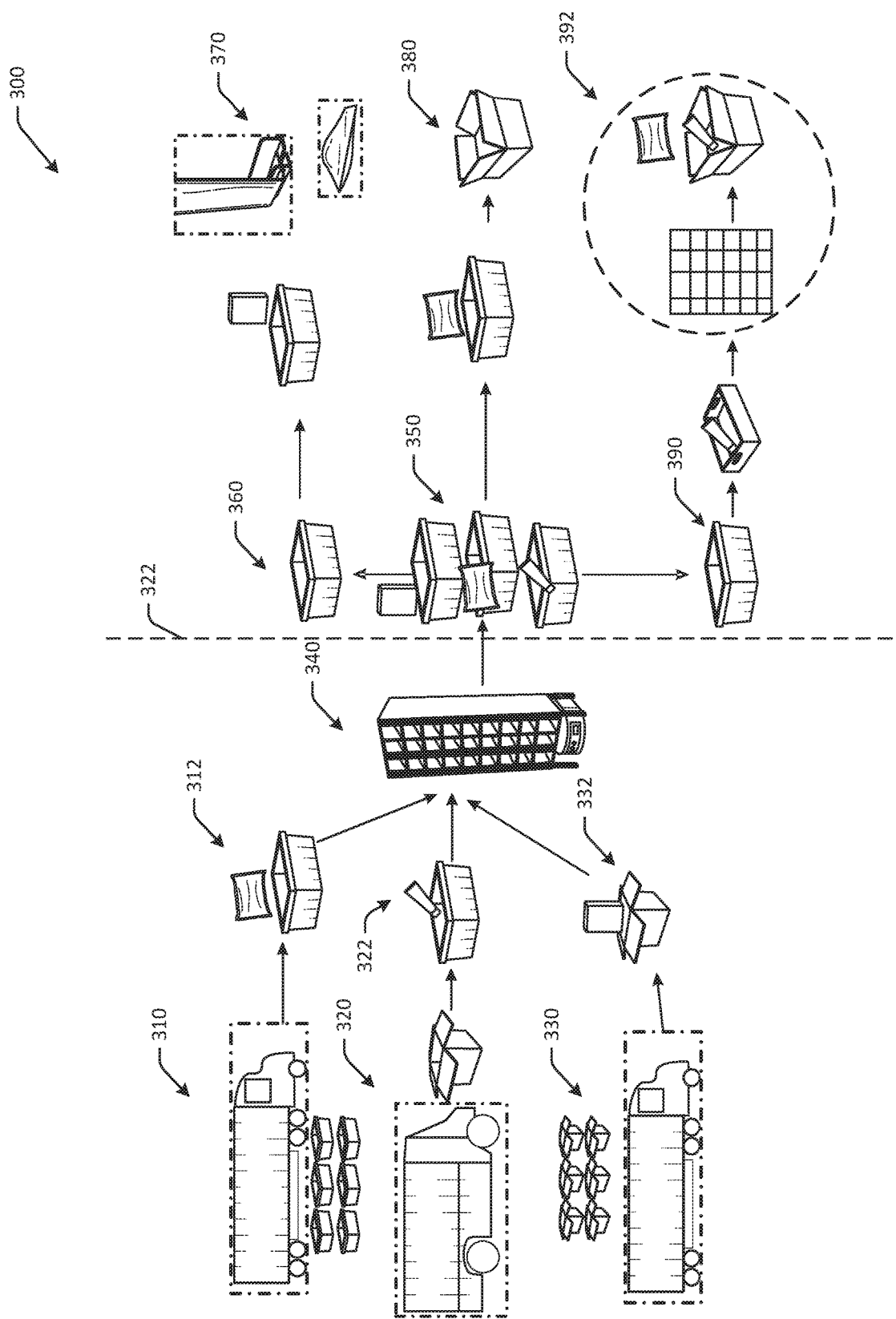
FIG. 3 is a schematic illustration of an example use case for an automated custom shipping container system in a fulfillment center in accordance with one or more embodiments of the disclosure.

FIG. 3 is a schematic illustration of an example use case for an automated custom shipping container system in a fulfillment center 300 in accordance with one or more embodiments of the disclosure. Other embodiments may include additional or fewer components. The illustration of FIG. 3 is not to scale, and may not be illustrated to scale with respect to other figures. The system illustrated in FIG. 3 may include the same automated custom shipping containers system discussed with respect to FIGS. 1-2.

In FIG. 3, inventory may be delivered to a fulfillment center via truck shipments 310 that may include totes. The inventory may be unloaded into totes 312 and placed into shelves 340 in an inventory field of the fulfillment center. Inventory may also be delivered via boxes 320 that may be emptied into totes 322 and transported to shelves 340 for storage. Inventory may also be delivered in a number of boxes 330, unloaded from the boxes 332, and transported to shelves 340 without totes. The inventory inbound process is separated from an output process in the illustration of FIG. 3 via vertical line 322.

When an order is placed and is to be fulfilled by the fulfillment center, the items in the order may be pulled from the shelves 340 or elsewhere in inventory storage and placed into totes for sortation. Depending on the type of item, the tote in which the item(s) are placed may be routed to different packing stations. For example, a first item in a first tote 360 may be routed to a bubble wrap packing station 370. A second item in a second tote 350 may be routed to a single item box packing station 380. A third item in a third tote 390 may be routed to a multi-item packing station 392. Automated custom shipping container systems as described herein may be used at one or more of the packing stations illustrated in FIG. 3, such as the single item box packing station 380, the multi-item packing station 392, etc.

Figure 4:
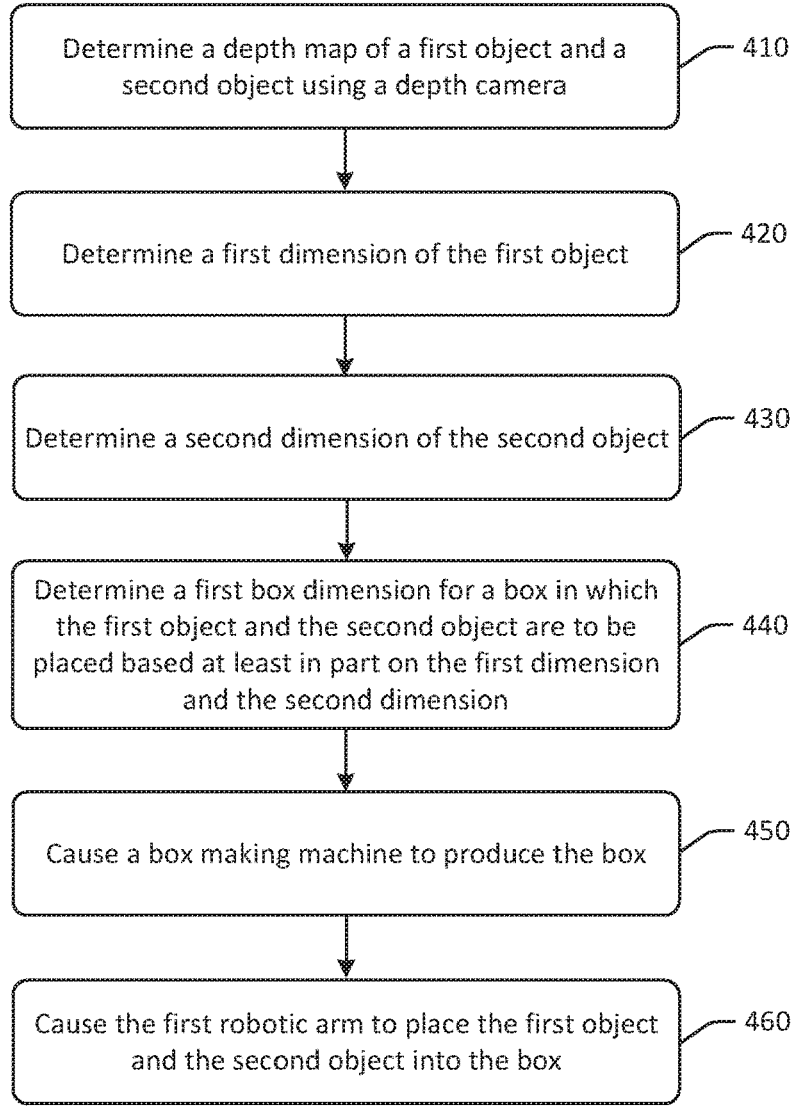
FIG. 4 is a schematic illustration of an example process flow for automated custom shipping containers in accordance with one or more example embodiments of the disclosure.

FIG. 4 depicts an example process flow 400 for automated custom shipping containers in accordance with one or more example embodiments of the disclosure. While example embodiments of the disclosure may be described in the context of boxes, it should be appreciated that the disclosure is more broadly applicable to any type of custom generated shipping container in which items, such as products, boxes, bags of products, and so forth can be placed. Some or all of the blocks of the process flows in this disclosure may be performed in a distributed manner across any number of devices. The operations of the process flow 400 may be optional and may be performed in a different order.

At block 410 of the process flow 400, computer-executable instructions stored on a memory of a device, such as a remote server or a device controller, may be executed to determine a depth map of a first object and a second object using a depth camera. For example, one or more packing optimization modules at a remote server may be configured to determine a depth map of a first object and a second object using a depth camera. The first object and the second object may be items associated with the same online order, and may have arrived at a packing station from a different field of a fulfillment center. The first object and the second object may complete the items in the online order. Accordingly, the objects may be ready for packing into a shipment. The first object and the second object may be delivered to the packing station in a tote or other container. For example, the objects may be removed from a sortation machine and delivered to the packing station. The system may include or may otherwise be in communication with one or more depth cameras that may be used to image the first object and the second object. The depth camera may output a depth map, or other three-dimensional representation, of the first object and the second object. In some embodiments, the depth camera(s) may be statically mounted on an overhead assembly and used to generate a top-down depth map. In other embodiments, the depth camera(s) may be coupled to a robotic arm assembly, which may be used to transport the depth camera(s) around a top and/or lateral sides of the first object and the second object to generate imaging of increased accuracy. For example, for an item like a basketball, a top-down image may represent the basketball as a cylindrical object, whereas side imaging may indicate that the basketball has a spherical shape. In some embodiments, separate cameras may be used for lateral and top-down imaging. The output from the depth camera(s) may be sent to one or more computer systems for further processing.

At block 420 of the process flow 400, computer-executable instructions stored on a memory of a device, such as a remote server or a device controller, may be executed to determine a first dimension of the first object. For example, one or more packing optimization modules at a remote server at a remote server may be configured to determine a first dimension of the first object. Output from the depth camera(s) may be received or otherwise determined by the computer system. The computer system may process the images and/or depth map to segment the objects into discrete representations of the first object and the second object. For example, the computer system may separate data associated with the first object from the second object, such that individual features for the respective objects may be determined. In some embodiments, the discrete representations may be color-coded for user visibility.

The computer system may determine various features of the respective objects using the depth map data. For example, the computer system may determine one or more dimensions of the object, such as a height, length, and/or width. In some instances, the computer system may calculate a volume of the respective objects. In instances where a top-down depth camera view is used, the computer system may assume that the object is on a flat surface, such as on a tabletop surface, inside a tote or other container on a flat surface, and so forth. The one or more dimensions of the first object may be determined by processing the image and/or depth map to determine approximate dimension(s) of the particular object. In instances where side images of the objects are available, the depth map data from multiple angles may be combined to generate a composite depth map that may be used to determine one or more dimensions of the first object.

In some embodiments, the computer system may identify the first object and/or the second object, and may determine one or more dimensions of the object using associated data.

For example, the computer system may be configured to use a scanner, such as a barcode scanner, to scan a barcode or other machine-readable code on the object. The computer system may use data associated with the machine-readable code to determine or otherwise identify the object. Based at least in part on the identified object and/or associated data, the computer system may determine characteristics of the object, such as weight, dimensions, and/or other characteristics. Such data, if available, may be used to determine accuracy of dimensions determined using depth map data.

At block 430 of the process flow 400, computer-executable instructions stored on a memory of a device, such as a remote server or a device controller, may be executed to determine a second dimension of the second object. For example, one or more packing optimization modules at a remote server may determine a second dimension of the second object. As discussed above, output from the depth camera(s) may be received or otherwise determined by the computer system. The computer system may process the images and/or depth map to segment the objects into discrete representations of the first object and the second object. For example, the computer system may separate data associated with the first object from the second object, such that individual features for the respective objects may be determined. In some embodiments, the discrete representations may be color-coded for user visibility.

The computer system may determine various features of the respective objects using the depth map data. For example, the computer system may determine one or more dimensions of the object, such as a height, length, and/or width. In some instances, the computer system may calculate a volume of the respective objects. In instances where a top-down depth camera view is used, the computer system may assume that the object is on a flat surface, such as on a tabletop surface, inside a tote or other container on a flat surface, and so forth. The one or more dimensions of the first object may be determined by processing the image and/or depth map to determine approximate dimension(s) of the particular object. In instances where side images of the objects are available, the depth map data from multiple angles may be combined to generate a composite depth map that may be used to determine one or more dimensions of the second object.

In some embodiments, the computer system may identify the first object and/or the second object, and may determine one or more dimensions of the object using associated data. For example, the computer system may be configured to use a scanner, such as a barcode scanner, to scan a barcode or other machine-readable code on the object. The computer system may use data associated with the machine-readable code to determine or otherwise identify the object. Based at least in part on the identified object and/or associated data, the computer system may determine characteristics of the object, such as weight, dimensions, and/or other characteristics. Such data, if available, may be used to determine accuracy of dimensions determined using depth map data.

At block 440 of the process flow 400, computer-executable instructions stored on a memory of a device, such as a remote server or a device controller, may be executed to determine a first box dimension for a box in which the first object and the second object are to be placed based at least in part on the first dimension and the second dimension. For example, one or more packing optimization modules at a remote server may be configured to determine a first box dimension for a box in which the first object and the second object are to be placed based at least in part on the first dimension and the second dimension. In an example, the computer system may determine a first height of the first object and a second height of the second object. The computer system may determine, using the first height and the second height, a third height as the first box dimension. For example, the third height may be equal to the greater of the first height or the second height if the objects are to be packed side-by-side, equal to a sum of the first height and the second height if the objects are to be stacked, and so forth. In another example, length or widths of the first object and the second object may be used to determine a length and/or width of the box. In some embodiments, more than one dimension of the respective objects may be used in conjunction with each other to determine box dimensions. For example, lengths and widths of the objects may be determined and used to determine an optimal packing arrangement, which may include reorienting an object. For example, the optimal packing arrangement may include rotating an object from a horizontal orientation to a vertical orientation, or to a different orientation. The optimal packing arrangement, discussed in more detail with respect to FIG. 5, may be used to determine custom box dimensions.

In another example, the computer system may determine a third dimension of the first object, and a fourth dimension of the second object. The computer system may determine a second box dimension for the box in which the first object and the second object are to be placed based at least in part on the third dimension and the fourth dimension.

At block 450 of the process flow 400, computer-executable instructions stored on a memory of a device, such as a remote server or a device controller, may be executed to cause a box making machine to produce the box. For example, one or more packing optimization modules at a remote server may cause a box making machine to produce the box. In some embodiments, the computer system may send a signal to a box making machine that initiates production of the custom-sized box at a box making machine. For example, one or more signals or commands may be sent to the box making machine that initiates production of the box or otherwise causes a process to form the box to be initiated. The computer system may be in communication with a box making machine or other custom container generating equipment. The computer system may send the first box dimension and/or other dimension data to the box making machine to produce a custom-sized box. In some embodiments, the computer system may select a type of box to be produced using the custom dimensions, such as a standard open top box, a flap top container box, a self-closing box, or another box type. The box making machine may receive the dimension data and produce a custom-sized box with the requested dimensions. The dimensions may include clearance for a robotic arm in some embodiments.

At block 460 of the process flow 400, computer-executable instructions stored on a memory of a device, such as a remote server or a device controller, may be executed to cause the first robotic arm to place the first object and the second object into the box. For example, one or more packing optimization modules at a remote server may cause the first robotic arm to place the first object and the second object into the box. The computer system may determine that the custom-sized box is available and/or has been produced, and may cause a first robotic arm to move to a pick point, and grasp the first object using an end of arm tool or end effector, such as one or more suction cups, a two-fingered gripper, a claw, or other end of arm tool. The computer system may cause the first robotic arm to move the first object to the box and to place the first object into the box. The computer system may similarly cause the first robotic arm to place the second object into the box. The box may then be sealed, a shipping label may be applied, and then the box may be shipped.

In some embodiments, the computer system may determine shapes of the respective first and second objects (e.g., using the depth map(s), etc.), and may determine an optimal packing arrangement based at least in part on the first shape and the second shape. For example, objects that are rectangular may be placed on a bottom of a box, whereas round objects may be placed at the top of a box, and so forth. In another example, the computer system may determine product attributes of the respective first and second objects (e.g., using barcodes or other identification criteria, etc.), and may determine an optimal packing arrangement based at least in part on the first product attribute and the second product attribute. For example, the computer system may determine that a certain product is fragile, such as a bag of potato chips, based at least in part on product attributes associated with an identifier of the object in the order being fulfilled to determine that the object is to be placed at the top of the box instead of the bottom of the box, and so forth.

In another example, the computer system may determine a first shape of the first object, and may determine a second shape of the second object. The computer system may determine a sequence of placement for the first object and the second object into the box based at least in part on the first shape and the second shape. For example, a flat object or cube-shaped object may be placed into the box first, so that the object is at the bottom of the box.

In another example, the computer system may determine a first shape of the first object, and/or may determine a second shape of the second object. The computer system may determine or select a box type based at least in part on the shape of the first object. For example, a box type having a cube-shape may be selected instead of a rectangular-shaped box depending on the shape of one or more objects to be placed into the box.

In another example, the computer system may determine a sequence of placement for the objects into the box (e.g., which object is placed in the box first, second, etc.) based at least in part on the end effector type. For example, different end effector types may be able to reorient objects differently, and some end effectors, such as suction cups, may not be able to reorient objects. Accordingly, the computer system may determine an end effector type for an end effector coupled to the first robotic arm, and may determine that the end effector type is configured to rotate objects from a horizontal orientation to a vertical orientation. This may increase the flexibility the computer system has to determine the optimal packing arrangement and/or sequence of placement for the objects into the box. For example, if a rectangular object can be rotated, the computer system may determine a taller box can be used rather than a box having a longer length, etc. which could result in a more compact and densely packed final box depending on dimensions and shapes of the other objects in the box. The computer system may therefore determine the sequence of placement and/or optimal packing arrangement based at least in part on functionality of the end effector type.

Figure 5:
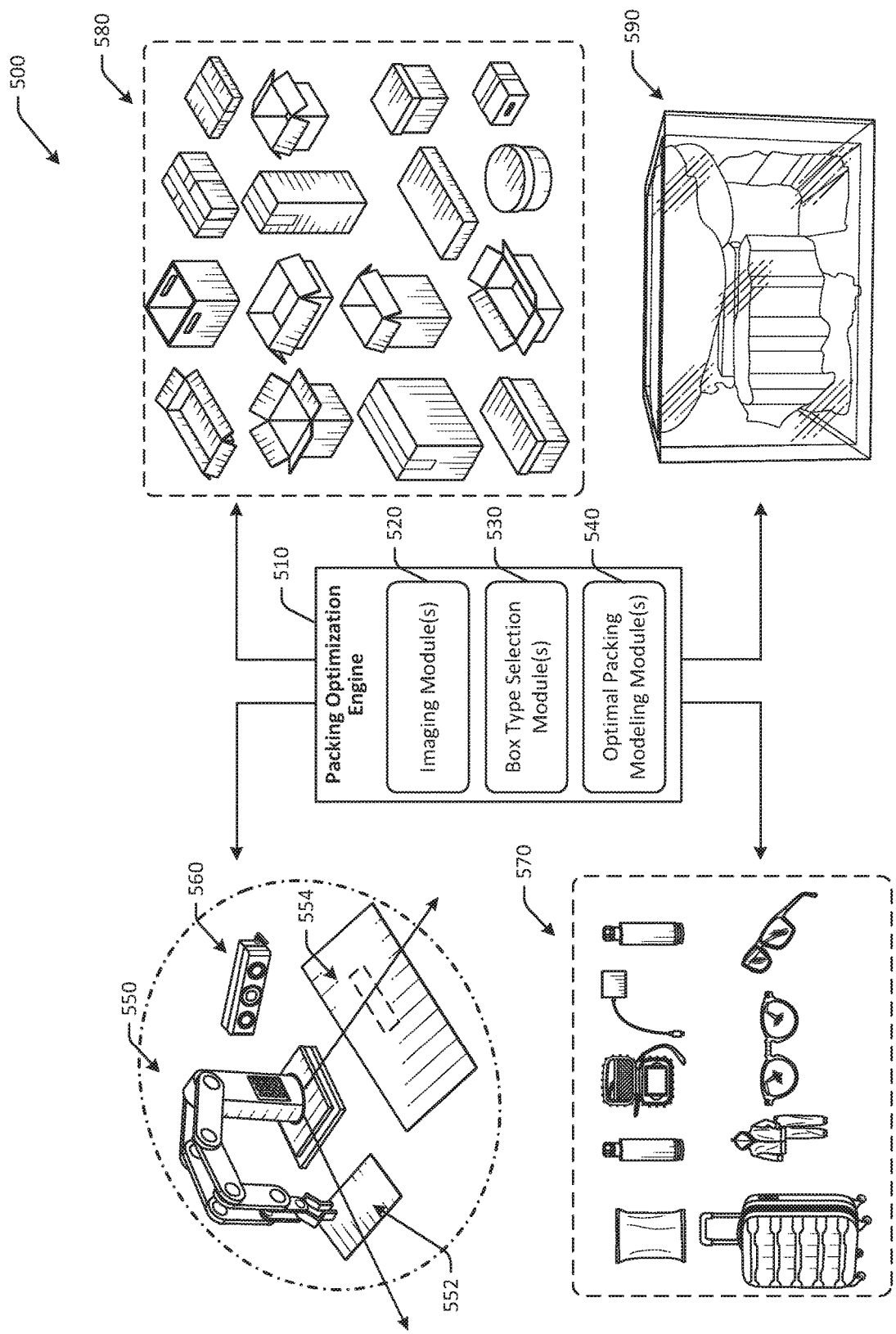
FIG. 5 is a schematic illustration of an example packing optimization engine of an automated custom shipping container system in accordance with one or more embodiments of the disclosure.

FIG. 5 is a schematic illustration of an example packing optimization engine of an automated custom shipping container system 500 in accordance with one or more embodiments of the disclosure. Other embodiments may include additional or fewer components. The illustration of FIG. 5 is not to scale, and may not be illustrated to scale with respect to other figures. The system illustrated in FIG. 5 may be the same automated custom shipping containers system discussed with respect to FIGS. 1-4.

In FIG. 5, the automated custom shipping container system 500 may include a packing optimization engine 510. The packing optimization engine 510 may be a software application and/or may include one or modules. The packing optimization engine 510 may be stored and/or executed by a computer system associated with the automated custom shipping container system 500. The packing optimization engine 510 may be configured to determine object dimensions for objects that are to be packed, box dimensions for custom-sized boxes, and may optionally be configured to determine or select a box type for packing objects. In some instances, the packing optimization engine 510 may be configured to determine an optimal packing arrangement for multi-item orders, and/or a sequence in which items of a multi-item order are to be placed or packed into a box.

For example, the computer system at which the packing optimization engine 510 is executed may be in communication with a first robotic arm 550, a depth camera 560, and a box making machine configured to produce at least one type of box 580. In some embodiments, the computer system may be in communication with the depth camera 560, the first robotic arm 550 configured to grasp objects, and a box making machine configured to generate boxes.

The packing optimization engine 510 may be configured to determine a depth map of a first object and a second object using the depth camera 560. For example, the objects may be placed on a tabletop surface 554, at which the depth camera 560 may be used to determine a depth map of the objects. The tabletop surface 554 may be adjacent to an optional packing area 552. In some embodiments, the depth camera 560 may be coupled to an overhead assembly and configured to generate a top-down view of the objects. The packing optimization engine 510 may include one or more imaging modules 520 that may be used to capture the images and/or depth map data of the objects using the depth camera. The imaging modules 520 may be configured to process the data to determine or otherwise segment the depth data into discrete representations of the first object and the second object. The imaging modules 520 may be configured to determine a first dimension of the first object using the imaging and/or depth map data. The imaging modules 520 may be configured to determine a second dimension of the second object using the imaging and/or depth map data.

For example, a number of objects 570 may be imaged using the depth camera 560, such as chips, hot sauce bottles, adapters, suitcases, pajamas, sunglasses, and so forth. The packing optimization engine 510 may be configured to determine length, width, height, and/or volume dimension information for the respective objects. Based at least in part on one or more dimensions for some or all of the objects to be packed, the packing optimization engine 510 may determine a first box dimension for a box in which the first object and the second object are to be placed.

In some embodiments, the packing optimization engine 510 may include one or more box type selection modules 530 that may be configured to determine or select a box type for a custom box that is to be produced, in addition to determining box dimensions. For example, a box making machine may be configured to produce a number of different box types, such as the box types 580 depicted in FIG. 5. Box types may include cube type boxes, rectangular type boxes, boxes with detached lids, boxes with attached lids, boxes with flap lids, round or cylindrical type boxes, and so forth. To select a box type, the packing optimization engine 510 may be configured to determine a shape of the first object and/or the second object in an order, and may select a box type based at least in part on the shape of the first object or the shape of the second object. For example, if the objects are both cubes, the packing optimization engine 510 may select a rectangular box type, and so forth.

The packing optimization engine 510 may cause the box making machine to produce the box with the determined box dimensions, and optionally of the selected box type. The custom-sized box may be produced by the box making machine, and may be positioned adjacent to the first robotic arm 550. The packing optimization engine 510 may cause the first robotic arm 550 to place the first object and the second object into the box.

In some embodiments, the packing optimization engine 510 may include one or more optimal packing modeling modules 540 that may be configured to generate a model 590 of an optimally packed box, where the objects are all placed into the custom box. The model 590 may represent an arrangement of the objects in the order inside the custom box and may account for robotic arm clearance. The model 590 may represent a maximum packing density for the items in the box, and therefore, no additional packing materials, such as paper, bubble wrap, etc. may be needed.

To determine the optimal packing model 590, the packing optimization engine 510 may be configured to determine a first shape of the first object, determine a second shape of the second object, and determine an optimal packing arrangement based at least in part on the first shape and the second shape. For example, larger objects may be placed at or near a bottom of the box, odd shaped objects may be placed at or near a top or sides of a box, and the like.

In some embodiments, the packing optimization engine 510 may be configured to determine a sequence in which the objects are to be placed into the box. The sequence may be determined so as to achieve the optimal packing arrangement of the model 590, or independently. For example, even if the model 590 is not determined, the packing optimization engine 510 may still determine a packing sequence where larger items are packed first, etc. To determine a sequence of placement, the packing optimization engine 510 may determine a first shape of the first object, determine a second shape of the second object, and determine a sequence of placement for the first object and the second object into the box based at least in part on the first shape and/or the second shape. For example, a large spherical object, such as a basketball, may be placed at a bottom of the box, and a flat rectangular object may be placed vertically adjacent to the basketball.

However, the optimal packing arrangement model 590 may not be achievable in all instances due to limitations of an end effector for the first robotic arm 550. For example, certain end of arm tools or end effectors may not be able to reorient objects in a certain manner and/or within the space constraints of a particular box. Accordingly, in some embodiments, the packing optimization engine 510 may be configured to generate the model 590 based at least in part on an end effector type available at the first robotic arm 550. For example, the packing optimization engine 510 may determine an end effector type for an end effector coupled to the first robotic arm 550, and may determine that the end effector type is configured to rotate objects from a horizontal orientation to a vertical orientation. The packing optimization engine 510 may therefore determine the sequence of placement for the objects based at least in part on the end effector type.

In some embodiments, the packing optimization engine 510 may be configured to determine whether the shape of an object has changed. For example, the object may be deformable or may articulate when picked up by the first robotic arm 550. Accordingly, the packing optimization engine 510 may determine that the first robotic arm grasped the first object, and may optionally cause the first object to be imaged using the depth camera while the first object is grasped. Based at least in part on the image, the packing optimization engine 510 may determine that the first object is deformable, and, if needed, may determine a modified sequence of placement for the first object. For example, deformable objects may be placed at a top of the box or last in a sequence of placement.

Figure 6:
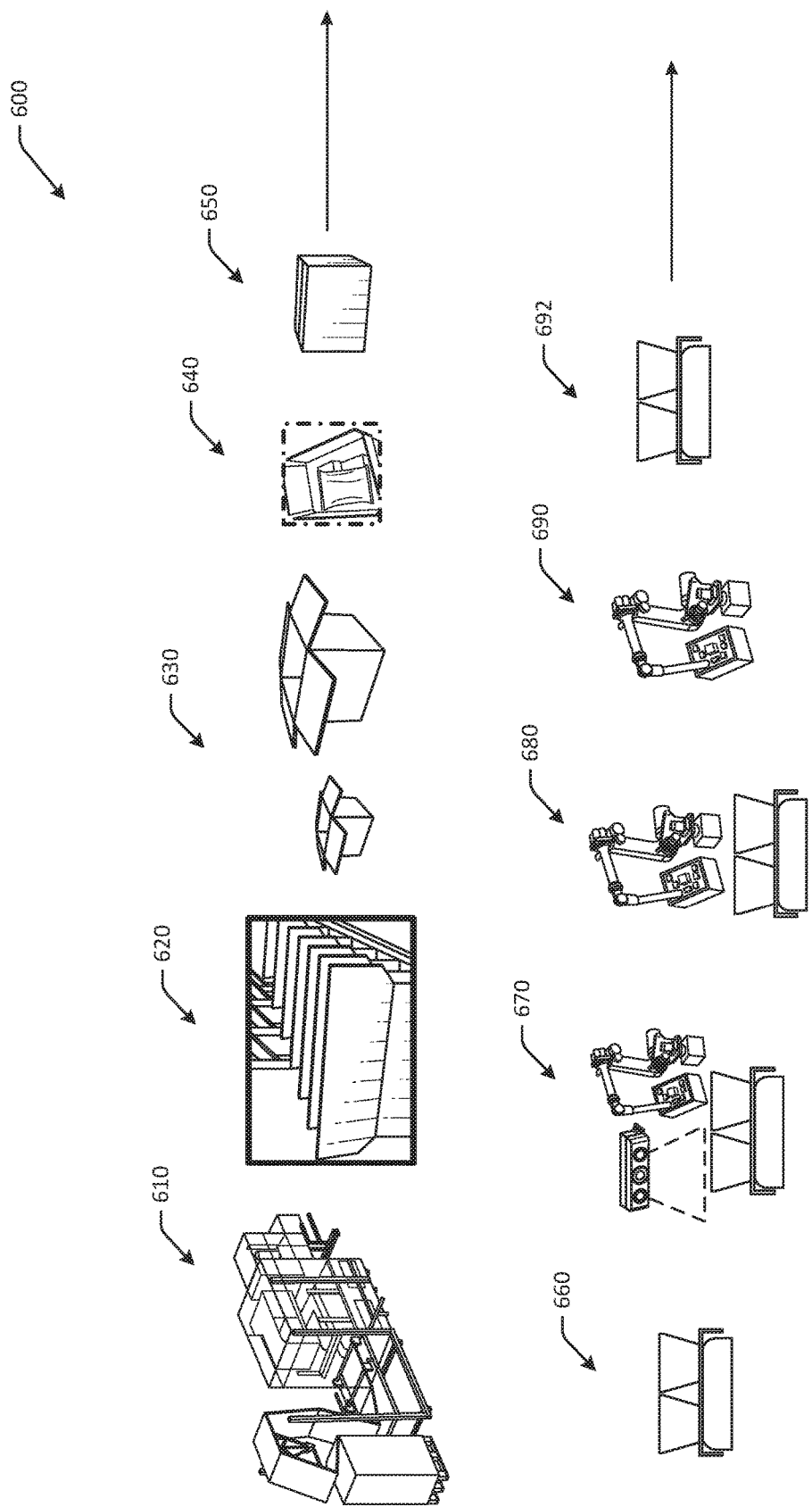
FIG. 6 is a schematic illustration of an example synchronized process flow for automated custom shipping containers in accordance with one or more embodiments of the disclosure.

FIG. 6 is a schematic illustration of an example synchronized process flow 600 for automated custom shipping containers in accordance with one or more embodiments of the disclosure. Other embodiments may include additional or fewer components. The illustration of FIG. 6 is not to scale, and may not be illustrated to scale with respect to other figures. The system illustrated in FIG. 6 may be the same automated custom shipping container system discussed with respect to FIGS. 1-5.

In FIG. 6, a box making machine 610 may be configured to produce custom-sized boxes on demand. For example, the box making machine 610 may use a supply of corrugate blanks 620 to produce boxes 630 of various sizes. The boxes 630 may be sent to a robotic packing system 670 that may be configured to pack one or more items into a particular box. For example, items for packing may be sent to the robotic packing system 670 in one or more totes 660 or other containers. The totes 660 may be delivered to the robotic packing system 670 via one or more drive robots or conveyors. The robotic packing system 670 may be configured to image the items for packing using one or more depth cameras, and the image data may be used to determine dimensions for a custom-sized box. The dimensions may be sent to the box making machine 610 to produce the box. As illustrated at states 680 and 690, the robotic packing system 670 may be configured to remove the items from the tote 660, and place the items into the box, as illustrated at top view 640. The box may be filled and sealed 650, and may be shipped to a destination. Empty totes 692 may be routed back into the fulfillment center. The robotic packing system 670 may therefore be configured to pack single item orders and multi-item orders into custom-sized boxes, and the box making machine 610 may be configured to produce boxes of custom dimensions on demand.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
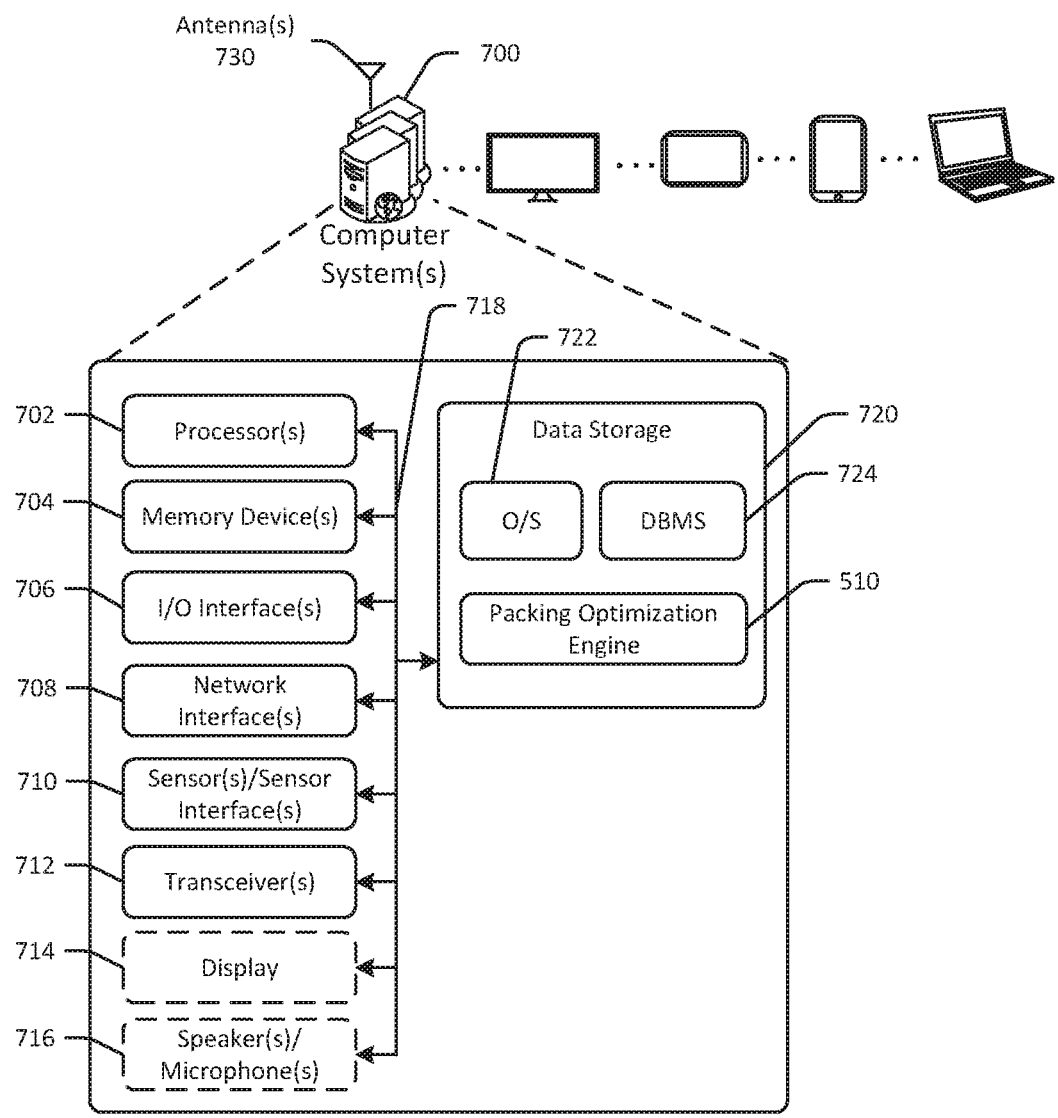
FIG. 7 schematically illustrates an example architecture of a computer system associated with an automated custom shipping containers system in accordance with one or more embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for the device(s) of FIGS. 1-6. For example, the computer system(s) 700 may be a controller and may control one or more aspects of the automated custom shipping containers system described in FIGS. 1-6.

The computer system(s) 700 may be configured to communicate with one or more servers, user devices, or the like. The computer system(s) 700 may be configured to identify items, retrieve items, move items, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like, such as the packing optimization engine 510 discussed with respect to FIG. 5. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-6 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A robotic system comprising:
    a first robotic arm configured to move about a tabletop surface;
    a depth camera coupled to the first robotic arm, wherein the depth camera is configured to generate three-dimensional representations of objects comprising a first object, a second object, and a third object on the tabletop surface;
    a second robotic arm configured to pick the objects off the tabletop surface and place the objects into a custom-sized box;
    an on demand custom box making machine configured to generate boxes of custom dimensions; and
    a computer system in communication with the first robotic arm, the depth camera, the second robotic arm, and the custom box making machine, the computer system configured to:
        determine first dimensions of the first object using the depth camera;
        determine second dimensions of the second object using the depth camera;
        determine third dimensions of the third object using the depth camera;
        determine box dimensions of the custom-sized box based at least in part on the first dimensions, the second dimensions, and the third dimensions;
        cause the custom box making machine to generate the custom-sized box;
        determine that the second robotic arm grasped the first object;
        cause the first object to be imaged using the depth camera while the first object is grasped;
        determine that the first object is deformable;
        determine a first sequence of placement for the first object; and
    cause the second robotic arm to place the objects into the custom-sized box.

2. The robotic system of claim 1, wherein the computer system is further configured to:
    cause the first robotic arm to move the depth camera around lateral sides of the tabletop surface to image side surfaces of the objects, and over the tabletop surface to image top surfaces of the objects; and
    processing the three-dimensional representations to identify discrete object representations.

3. The robotic system of claim 1, wherein the computer system is further configured to:
    determine a first shape of the first object;
    determine a second shape of the second object;
    determine a third shape of the third object;
    determine an optimal packing arrangement based at least in part on the first shape, the second shape, and the third shape; and
    determine a second sequence of placement for the objects into the custom-sized box based at least in part on the optimal packing arrangement;
    wherein the first object is placed into the custom-sized box after the second object and before the third object.

4. The robotic system of claim 3, wherein the computer system is further configured to:
- determine an end effector type for an end effector coupled to the second robotic arm, wherein the end effector is configured to grasp objects; and
- determine that the end effector type is configured to rotate objects from a horizontal orientation to a vertical orientation;
- wherein the computer system is further configured to determine the sequence of placement for the objects based at least in part on the end effector type.

5. A system comprising:
- a depth camera;
- a first robotic arm configured to grasp objects; and
- a computer system configured to:
  - determine a depth map of a first object and a second object using the depth camera;
  - determine a first dimension of the first object;
  - determine a second dimension of the second object;
  - determine a first box dimension for a box in which the first object and the second object are to be placed based at least in part on the first dimension and the second dimension;
  - send a signal to a box making machine that initiates production of the box at the box making machine;
  - determine that the first robotic arm grasped the first object;
  - cause the first object to be imaged using the depth camera while the first object is grasped;
  - determine that the first object is deformable;
  - determine a first sequence of placement for the first object; and
  - cause the first robotic arm to place the first object and the second object into the box.

6. The system of claim 5, wherein the computer system is further configured to:
- determine a third dimension of the first object;
- determine a fourth dimension of the second object; and
- determine a second box dimension for the box in which the first object and the second object are to be placed based at least in part on the third dimension and the fourth dimension.

7. The system of claim 5, wherein the computer system is further configured to:
- determine a first shape of the first object;
- determine a second shape of the second object; and
- determine an optimal packing arrangement based at least in part on the first shape and the second shape.

8. The system of claim 5, further comprising:
- a second robotic arm;
- wherein the depth camera is coupled to the second robotic arm.

9. The system of claim 5, wherein the computer system is further configured to:
- determine a first product attribute of the first object;
- determine a second product attribute of the second object; and
- determine an optimal packing arrangement based at least in part on the first product attribute and the second product attribute.

10. The system of claim 5, wherein the computer system is further configured to:
- determine a shape of the first object; and
- select a box type based at least in part on the shape of the first object.

11. The system of claim 5, wherein the computer system is further configured to:
- process the depth map to segment discrete object representations corresponding to the first object and the second object.

12. The system of claim 5, wherein the computer system is further configured to:
- determine a first shape of the first object;
- determine a second shape of the second object; and
- determine a second sequence of placement for the first object and the second object into the box based at least in part on the first shape and the second shape.

13. The system of claim 12, wherein the computer system is further configured to:
- determine an end effector type for an end effector coupled to the first robotic arm; and
- determine that the end effector type is configured to rotate objects from a horizontal orientation to a vertical orientation;
- wherein the computer system is further configured to determine the second sequence of placement for the objects based at least in part on the end effector type.

14. A method comprising:
- determining, by a computer system, a depth map of a first object and a second object using a depth camera;
- determining a first dimension of the first object;
- determining a second dimension of the second object;
- determining a first box dimension for a box in which the first object and the second object are to be placed based at least in part on the first dimension and the second dimension;
- sending a signal to a box making machine that initiates production of the box;
- determining that the first robotic arm grasped the first object;
- causing the first object to be imaged using the depth camera while the first object is grasped;
- determining that the first object is deformable;
- determining a first sequence of placement for the first object; and
- causing the first robotic arm to place the first object and the second object into the box.

15. The method of claim 14, further comprising:
- determining a first shape of the first object;
- determining a second shape of the second object; and
- determining a second sequence of placement for the first object and the second object into the box based at least in part on the first shape and the second shape.

16. The method of claim 14, further comprising:
- determining an optimal packing arrangement based at least in part on the first shape and the second shape.

17. The method of claim 14, further comprising:
- determining a third dimension of the first object;
- determining a fourth dimension of the second object; and
- determining a second box dimension for the box in which the first object and the second object are to be placed based at least in part on the third dimension and the fourth dimension.

18. The method of claim 14, further comprising:
- determining an end effector type for an end effector coupled to the first robotic arm; and
- determining that the end effector type is configured to rotate objects from a horizontal orientation to a vertical orientation;
- wherein determining the first sequence of placement further comprises determining the sequence of placement for the objects based at least in part on the end effector type.

19. The method of claim 14, further comprising:
determining a shape of the first object; and
selecting a box type based at least in part on the shape of the first object.

* * * * *